(12) United States Patent
Liao et al.

(10) Patent No.: US 12,071,080 B2
(45) Date of Patent: Aug. 27, 2024

(54) LEATHER MATERIAL AND VEHICLE DASHBOARD COMPOSITE STRUCTURE

(71) Applicant: NAN YA PLASTICS CORPORATION, Taipei (TW)

(72) Inventors: Te-Chao Liao, Taipei (TW); Chun-Che Tsao, Taipei (TW); Jhen-Rong Syu, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 472 days.

(21) Appl. No.: 17/401,320

(22) Filed: Aug. 13, 2021

(65) Prior Publication Data
US 2022/0314904 A1  Oct. 6, 2022

(30) Foreign Application Priority Data

Apr. 6, 2021  (TW) ................. 110112282

(51) Int. Cl.
*B60R 13/02* (2006.01)
*B32B 5/24* (2006.01)
(Continued)

(52) U.S. Cl.
CPC .......... *B60R 13/0256* (2013.01); *B32B 5/245* (2013.01); *B32B 27/065* (2013.01); *B60K 35/60* (2024.01); *D06N 3/0013* (2013.01); *D06N 3/06* (2013.01); *B60K 35/10* (2024.01); *B60K 37/20* (2024.01); *B60K 2360/1438* (2024.01);
(Continued)

(58) Field of Classification Search
CPC .... B32B 3/30; B32B 5/18; B32B 5/24; B32B 5/245; B32B 27/065; B60R 13/0256; D06N 3/0013; D06N 3/06; D06N 2211/261; D06N 2211/28; B60K 37/02; B60K 2370/654; B60K 2370/688; B60K 2370/28; B60K 2370/1438
See application file for complete search history.

(56) References Cited

U.S. PATENT DOCUMENTS 11,061,475 B2 *  7/2021  Galan Garcia ....... B60R 16/037
2012/0128995 A1   5/2012  Leto et al.
(Continued)

FOREIGN PATENT DOCUMENTS

CN  201044982 Y  4/2008
CN  109610186 A  4/2019
(Continued)

*Primary Examiner* — Catherine A. Simone
(74) *Attorney, Agent, or Firm* — Li & Cai Intellectual Property Office

(57) ABSTRACT

A leather material suitable for being attached to a touch display panel such as a vehicle dashboard is provided. The leather material includes a foam layer and a fabric layer. The foam layer is foamed to provide a leather feel. The fabric layer is disposed on the foam layer, and the fabric layer is color-matched and embossed to present a leather pattern. Base materials of the foam layer and the fabric layer are both at least one material selected from the group consisting of polyvinyl chloride (PVC), polyurethane (PU), and polyolefin (PO). The leather material in entirety has a visible light transmittance of between 40% and 70% and has a resistivity of not less than $10^{10}$ Ωcm. A vehicle dashboard composite structure is also provided.

11 Claims, 3 Drawing Sheets

(51) Int. Cl.
  *B32B 27/06* (2006.01)
  *B60K 35/60* (2024.01)
  *D06N 3/00* (2006.01)
  *D06N 3/06* (2006.01)
  *B60K 35/10* (2024.01)
  *B60K 37/20* (2024.01)

(52) U.S. Cl.
  CPC .... *B60K 2360/28* (2024.01); *B60K 2360/688* (2024.01); *D06N 2211/261* (2013.01); *D06N 2211/28* (2013.01)

(56) References Cited

U.S. PATENT DOCUMENTS

| | | |
|---|---|---|
| 2020/0190731 A1 | 6/2020 | Min et al. |
| 2020/0241675 A1 | 7/2020 | Oki et al. |
| 2021/0070014 A1 | 3/2021 | Sun et al. |
| 2021/0206267 A1 | 7/2021 | Carvalho Da Silva et al. |

FOREIGN PATENT DOCUMENTS

| | | | | |
|---|---|---|---|---|
| CN | 110140098 A | 8/2019 | | |
| CN | 112030571 A | 12/2020 | | |
| CN | 112203888 A | 1/2021 | | |
| JP | 2013177714 A | 9/2013 | | |
| JP | 2014181424 A | 9/2014 | | |
| JP | 20172419 A | 1/2017 | | |
| JP | WO2019083051 A1 | 9/2020 | | |
| KR | 101698171 B1 | 1/2017 | | |
| TW | 201039296 A1 | 11/2010 | | |
| WO | WO-2018013557 A1 * | 1/2018 | ........... | B32B 27/065 |
| WO | WO2019054732 A1 | 3/2019 | | |

\* cited by examiner

LEATHER MATERIAL AND VEHICLE DASHBOARD COMPOSITE STRUCTURE

CROSS-REFERENCE TO RELATED PATENT APPLICATION

This application claims the benefit of priority to Taiwan Patent Application No. 110112282, filed on Apr. 6, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a leather material, and more particularly to a leather material suitable for being attached to a vehicle dashboard.

BACKGROUND OF THE DISCLOSURE

Out of products relating to vehicle dashboards on the current market, designs for synthetic leather have not yet appeared. The main reason is that a conventional synthetic leather has a shielding property. After the synthetic leather is attached to the vehicle dashboard, an image displayed by the vehicle dashboard cannot be shown through the synthetic leather. Furthermore, the synthetic leather will also affect touch-control characteristics of the vehicle dashboard.

SUMMARY OF THE DISCLOSURE

In response to the above-referenced technical inadequacies, the present disclosure provides a leather material suitable for being attached to a vehicle dashboard.

In one aspect, the present disclosure provides a leather material which is suitable for being attached to a touch display panel. The leather material includes a foam layer and a fabric layer. The foam layer is foamed to provide a leather feel. The fabric layer is disposed on the foam layer, and the fabric layer is color-matched and embossed to present a leather pattern. Base materials of the foam layer and the fabric layer are both at least one material selected from the group consisting of polyvinyl chloride (PVC), polyurethane (PU), and polyolefin (PO), and the leather material in entirety has a visible light transmittance of between 40% and 70% and has a resistivity of not less than 1010 Ωcm.

Preferably, when the leather material is attached to the touch display panel, the foam layer is attached to a display surface of the touch display panel, and the leather pattern presented by the fabric layer faces an external environment.

Preferably, the touch display panel is a vehicle dashboard with a touch display function. When the touch display panel selectively displays an image, the image is visible to a user through the foam layer and the fabric layer.

Preferably, when the touch display panel does not display the image, the fabric layer of the leather material is capable of shielding the touch display panel, and the leather pattern is capable of being shown through the fabric layer of the leather material.

Preferably, a thickness of the foam layer is greater than a thickness of the fabric layer, a hardness of the foam layer is less than a hardness of the fabric layer, and a visible light transmittance of the foam layer is greater than a visible light transmittance of the fabric layer.

Preferably, the foam layer is a foamed material that is foamed by a foaming agent. A ratio of a thickness of the foam layer after being foamed to a thickness of the foam layer before being foamed is defined as a foaming ratio, and the foaming ratio of the foam layer is between 105% and 130%. The foam layer has the thickness of between 50 μm and 1,000 μm after being foamed.

Preferably, the fabric layer has the thickness of between 2 micrometers and 200 micrometers, the fabric layer includes a color dye dispersed therein, and the color dye is dispersed in the fabric layer with a particle size of between 100 nanometers and 800 nanometers.

Preferably, a content range of the color dye in the fabric layer is not greater than 40 wt %, and a side surface of the fabric layer away from the foam layer is embossed or engraved, so that the fabric layer is color-matched and embossed to present the leather pattern.

Preferably, an overall thickness of the leather material is between 300 micrometers and 3,000 micrometers, and a ratio of the thickness of the foam layer to the thickness of the fabric layer is between 5 and 1,500.

Preferably, the leather material has a plurality of visible light transmittances respectively located at different regions thereof. In the plurality of visible light transmittances, a difference between a maximum visible light transmittance and a minimum visible light transmittance of the leather material is not greater than 1%.

In another aspect, the present disclosure also provides a vehicle dashboard composite structure including a vehicle dashboard and a leather material. The vehicle dashboard has a display surface, and the display surface of the vehicle dashboard is configured to selectively display an image. The leather material is attached to the display surface of the vehicle dashboard to cover the display surface. The leather material includes: a foam layer and a fabric layer. The foam layer is attached to the display surface, and the foam layer is foamed to provide a leather feel. The fabric layer is disposed on the foam layer, and the fabric layer is color-matched and embossed to present a leather pattern. Base materials of the foam layer and the fabric layer are both at least one material selected from the group consisting of polyvinyl chloride (PVC), polyurethane (PU), and polyolefin (PO), and the leather material in entirety has a visible light transmittance of between 40% and 70% and has a resistivity of not less than 1010 Ωcm.

Preferably, when the vehicle dashboard selectively displays the image, the image is visible to a user through the foam layer and the fabric layer. When the vehicle dashboard does not display the image, the fabric layer of the leather material is capable of shielding the vehicle dashboard, and the leather pattern is capable of being shown through the fabric layer of the leather material.

Therefore, by virtue of "a leather material includes a foam layer and a fabric layer; the foam layer is foamed to provide a leather feel; the fabric layer is disposed on the foam layer, and the fabric layer is color-matched and embossed to present a leather pattern" and "base materials of the foam layer and the fabric layer are both at least one material selected from the group consisting of polyvinyl chloride (PVC), polyurethane (PU), and polyolefin (PO)" and "the leather material in entirety has a visible light transmittance of between 40% and 70% and has a resistivity of not less than $10^{10}$ Ωcm", the leather material of the present disclosure is suitable for being attached to a touch display panel such as vehicle dashboard without affecting the image displaying effect and touch-control characteristics of the touch display panel.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
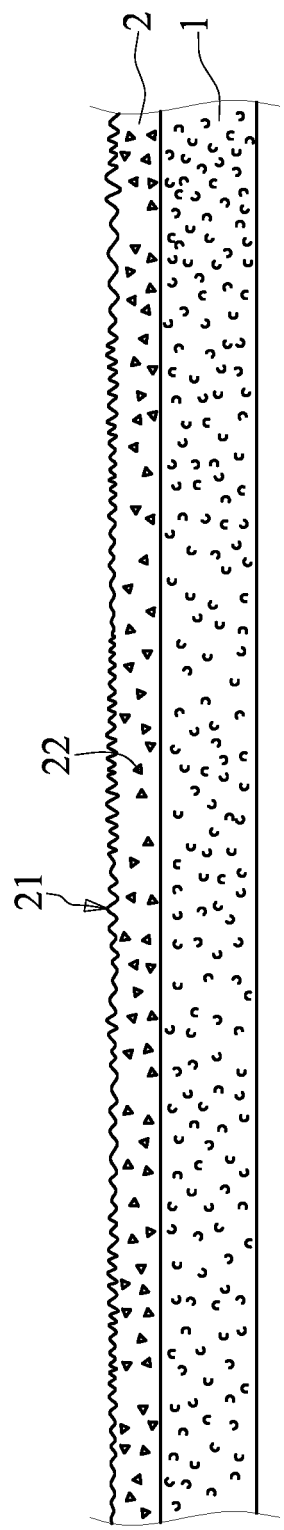
FIG. 1 is a cross-sectional view of a leather material according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

[Leather Material]

Referring to FIG. 1 to FIG. 5, embodiments of the present disclosure are illustrated. It should be noted that the relevant quantities and appearances mentioned in the corresponding drawings of the embodiments are only used to specifically illustrate the embodiments of the present disclosure in order to facilitate understanding of the contents of the present disclosure, and are not intended to limit the scope of the present disclosure.

Figure 2:
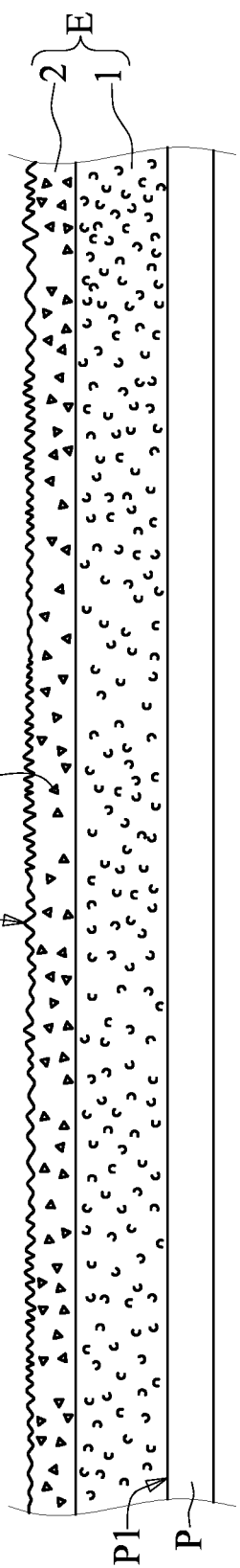
FIG. 2 is a first schematic view of the leather material attached to a vehicle dashboard.

As shown in FIG. 1 and FIG. 2, an embodiment of the present disclosure provides a leather material E. The leather material E is an artificial synthetic leather with semi-shielding properties. The base material used for the leather material E may be, for example, polyvinyl chloride (PVC), polyurethane (PU), or polyolefin (PO). The leather material E has balanced light transmitting and shielding properties.

Figure 3:
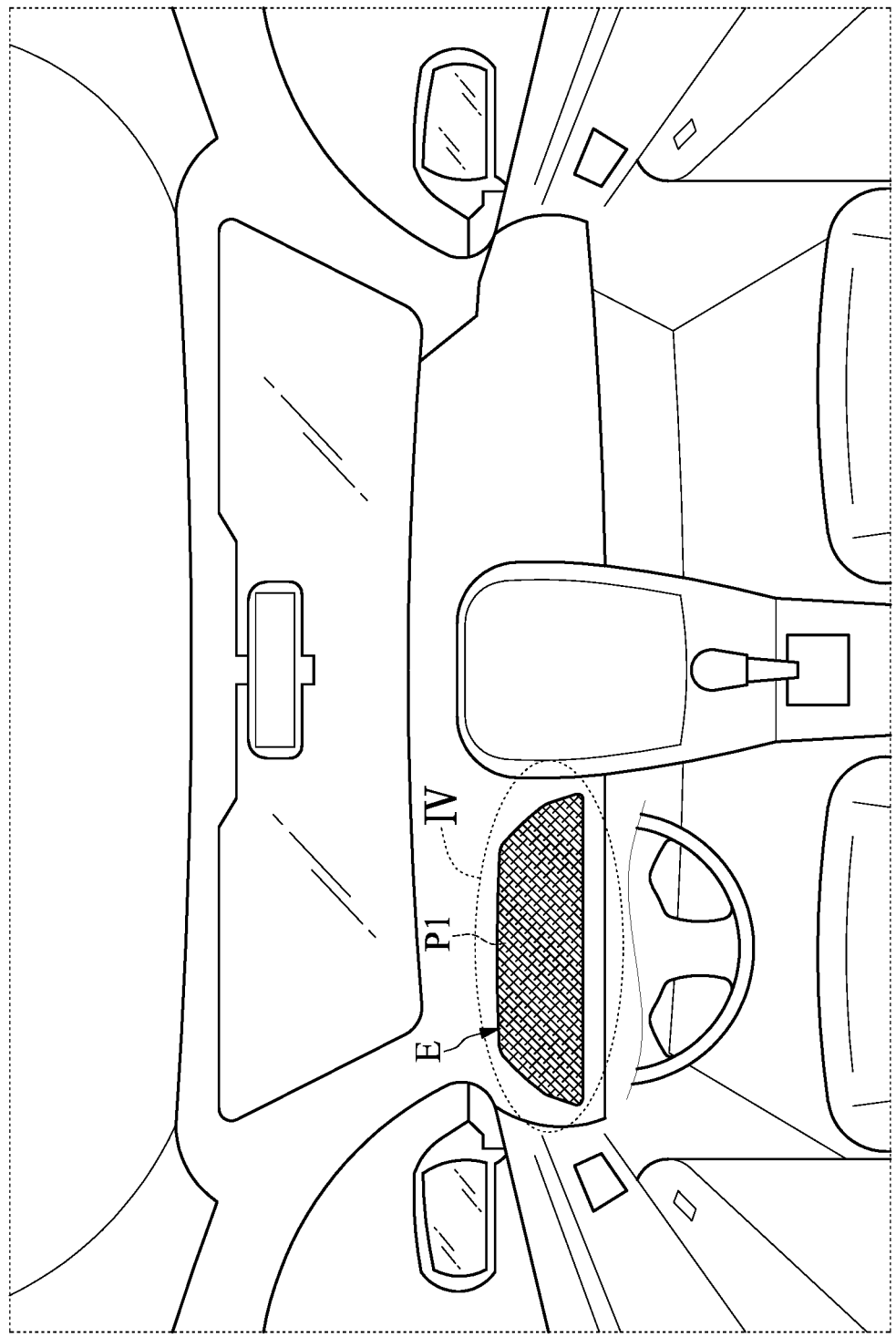
FIG. 3 is a second schematic view of the leather material attached to the vehicle dashboard.

The leather material E is suitable for being attached to a touch display panel P as shown in FIG. 2. That is, the leather material E can be matched with the touch display panel P, so that the touch display panel P has a special product appearance. In the present embodiment, the touch display panel P may be, for example, a vehicle dashboard, and especially a car dashboard as shown in FIG. 3, but the present disclosure is not limited thereto.

Figure 5:
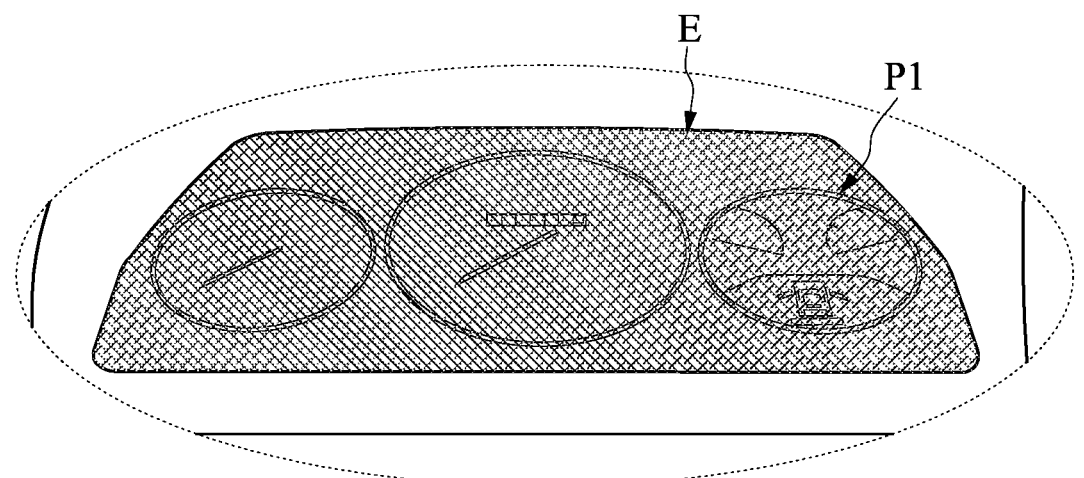
FIG. 5 is a schematic view of an image of the vehicle dashboard being shown through the leather material.

When the touch display panel P is activated and turned on, an image displayed by the touch display panel P can pass through the leather material E to present a display signal as shown in FIG. 5. The display signal may be, for example, a text signal, a graphic signal, or a human-computer interaction interface signal, and the present disclosure is not limited thereto.

Furthermore, when the touch display panel P is not activated and turned off, the leather material E can have a shielding effect on the touch display panel P to present a leather appearance.

The base material used for the leather material E is a soft material, which has good adhesion to the touch display panel P such as a vehicle dashboard, and does not affect touch sensitivity of the touch display panel P.

In order to enable the leather material E to simultaneously produce good shielding and light transmitting properties on a screen of the vehicle dashboard, a technical key of the present disclosure is that the leather material E is optimized, and highly dispersed pigment particles are introduced into the leather material E.

Referring to FIG. 1 again, the leather material E includes a foam layer 1 and a fabric layer 2 stacked to each other. The foam layer 1 is a foamed polymer material, and the foam layer 1 becomes thicker and softer after being foamed, so that the leather material E can have the leather feel through the foam layer 1. Furthermore, the fabric layer 2 is disposed on the foam layer 1, and the fabric layer 2 is a polymer material that has been color-matched and embossed, so that the leather material E can present a leather pattern 21 through the fabric layer 2.

It should be noted that although the leather material E of the present embodiment is collocated with the touch display panel P as an example, the actual application of the leather material E is not limited thereto. For example, the leather material E can also be an independently sold product, and can be applied to other types of electronic components, especially electronic components that can provide a display light source.

According to the above configuration, a main feature of the present disclosure is that the leather material E of the present disclosure has a specially designed two-layer stacked structure to produce balanced light transmitting and shielding properties.

As shown in FIG. 2 and FIG. 3, when the leather material E is attached to the touch display panel P, the foam layer 1 is attached to a display surface P1 of the touch display panel P, and the leather pattern 21 presented by the fabric layer 2 faces an external environment.

Furthermore, in the present embodiment, the touch display panel P is a vehicle dashboard with a touch function and a display function. As shown in FIG. 5, when the touch display panel P selectively displays an image, the image can be seen by a user through the foam layer 1 and the fabric layer 2. That is, when the touch display panel P selectively displays the image, the image is visible to the user through the leather material E. It is worth mentioning that the foam layer 1 can slightly produce an optical diffusion effect on the image of the touch display panel P so as to produce an effect of atmospheric lighting rendering, but the present disclosure is not limited thereto.

Figure 4:
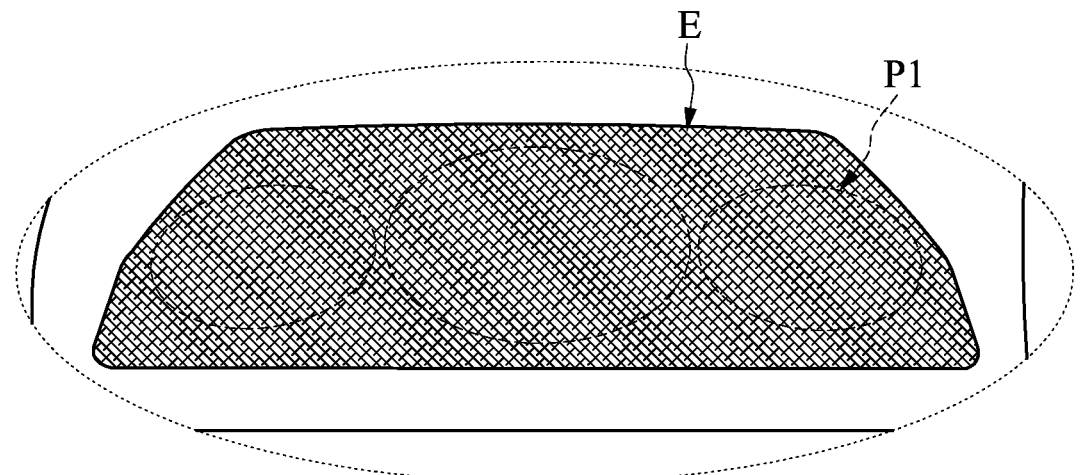
FIG. 4 is a schematic view of the leather material that generates a shielding effect on the vehicle dashboard.

In addition, as shown in FIG. 4, when the touch display panel P does not display the image, the fabric layer 2 of the leather material E is capable of shielding the touch display panel P, and the leather material E is capable of presenting the leather pattern 21 through the fabric layer 2. That is, the leather material E can produce a shielding effect when the touch display panel P is not activated.

Furthermore, in the leather material E, a base material of the foam layer 1 is at least one material selected from the group consisting of polyvinyl chloride (PVC), polyurethane (PU), and polyolefin (PO). In addition, a base material of the fabric layer 2 is at least one material selected from the group consisting of polyvinyl chloride (PVC), polyurethane (PU), and polyolefin (PO). According to the selection of the above-mentioned materials, the leather material E can have good light transmitting property.

It should be noted that the term "base material" used in the present disclosure refers to a material that occupies at least 50% of a total content of a layered structure, so that the base material can be presented as a continuous medium and exhibit its material properties (i.e., light transmittance).

The leather material E needs to have good light transmittance, so that when the touch display panel P displays an image, the image can be shown through the leather material E, and the image can have a good resolution. In an embodiment of the present disclosure, the leather material E in entirety generally has a visible light transmittance of between 40% and 70%, preferably between 50% and 70%, and more preferably between 50% and 65%, but the present disclosure is not limited thereto.

In addition, the leather material E needs to have a low resistivity, so that when the leather material E is attached to the touch display panel P and a user performs a touch operation on the touch display panel P, the leather material E will not affect the touch characteristics of the touch display panel P. In an embodiment of the present disclosure, the whole of the leather material E generally has a resistivity of not less than $10^{10}$ Ωcm, preferably between $10^{10}$ Ωcm and $10^{12}$ Ωcm, and more preferably between $10^{11}$ Ωcm and $10^{12}$ Ωcm, but the present disclosure is not limited thereto.

Furthermore, to enable the leather material E to have a good leather feel and balanced light transmitting and shielding properties, the foam layer 1 and the fabric layer 2 have a matching relationship with each other in material properties, such as thickness and hardness.

More specifically, a thickness of the foam layer 1 is preferably greater than a thickness of the fabric layer 2, a hardness of the foam layer 1 is preferably less than a hardness of the fabric layer 2, and a visible light transmittance of the foam layer 1 is preferably greater than a visible light transmittance of the fabric layer 2, but the present disclosure is not limited thereto.

Furthermore, an overall thickness of the leather material E is between 300 micrometers and 3,000 micrometers, preferably between 600 micrometers and 2,000 micrometers, and more preferably between 1,000 micrometers and 1,500 micrometers.

Among them, the foam layer 1 has a thickness of between 50 micrometers and 3,000 micrometers, preferably between 600 micrometers and 2,000 micrometers, and more preferably between 600 micrometers and 1,500 micrometers. Furthermore, the fabric layer 2 has a thickness of between 2 micrometers and 200 micrometers, preferably between 50 micrometers and 150 micrometers, and more preferably between 80 micrometers and 120 micrometers.

Furthermore, a ratio of the thickness of the foam layer 1 to the thickness of the fabric layer 2 is between 5 and 1,500, preferably between 5 and 1,200, and more preferably between 5 and 1,000.

To provide a good leather feel, the foam layer 1 is a material that is foamed by a foaming agent, such as a PU foaming agent or a PVC foaming agent.

In addition, a ratio of the thickness of the foam layer 1 after being foamed to the thickness of the foam layer 1 before being foamed is defined as a foaming ratio. The foaming ratio of the foam layer 1 is between 105% and 130%, preferably between 110% and 125%, and more preferably between 115% and 120%. Accordingly, the foam layer 1 can have appropriate softness and hardness, so that when the leather material E is attached to the touch display panel P, the leather material E can provide good leather feel without affecting touch performance of the touch display panel. The foam layer 1 has a thickness of between 50 micrometers and 1,000 micrometers after being foamed. According to the above configuration, the foam layer 1 can provide good leather feel and good light transmittance.

To enable the leather material E to have a leather visual effect, the fabric layer 2 has a thickness of between 2 micrometers and 200 micrometers. Furthermore, the fabric layer 2 includes a color dye 22 dispersed therein. The color dye 22 may be, for example, at least one of an inorganic color material and an organic color material.

In a preferred embodiment of the present disclosure, the color dye 22 has a low shielding property. In terms of particle size, the color dye 22 is dispersed in the fabric layer 2 with a particle size of between 100 nanometers and 800 nanometers, preferably between 400 nanometers and 800 nanometers, and more preferably between 600 nanometers and 700 nanometers. Accordingly, the color dye 22 has high dispersibility in the fabric layer 2 so as not to affect the appearance of the image displayed by the touch display panel P.

In the fabric layer 2, a content range of the color dye 22 is generally not greater than 40 wt %, preferably between 5 wt % and 40 wt %, and more preferably between 5 wt % and 20 wt %, but the present disclosure is not limited thereto.

Furthermore, a side surface of the fabric layer 2 away from the foam layer 1 is embossed or engraved, so that the fabric layer 2 is color-matched and embossed to present the leather pattern 21. According to the above configuration, the fabric layer 2 can provide the leather a visual effect and good light transmittance.

In addition, in an embodiment of the present disclosure, the leather material E has a plurality of visible light transmittances respectively located at different regions thereof. In the plurality of visible light transmittances, a difference between a maximum visible light transmittance and a minimum visible light transmittance of the leather material E is not greater than 1% (preferably not greater than 0.5%), so that the light transmittances of the leather material E are substantially uniform. Accordingly, when the leather material E is attached to the touch display panel P, the image displayed by the touch display panel P can be seen through the leather material E, the image can be fully and uninterruptedly shown on another side surface of the leather material E, and the image will not have an uneven brightness.

[Vehicle Dashboard Composite Structure]

The above-mentioned embodiment of the present disclosure provides a leather material E, which is an independently sold product. In the present embodiment, the leather material E and the vehicle dashboard (or car dashboard) can also form a composite structure to enable the vehicle dashboard to have a leather appearance and leather feel.

More specifically, referring to FIG. 2 to FIG. 5, the vehicle dashboard composite structure includes a vehicle dashboard P and a leather material E disposed on the vehicle dashboard P. The vehicle dashboard P has a display surface P1, and the display surface P1 of the vehicle dashboard P is configured to selectively display a dashboard image as shown in FIG. 5.

The leather material E is attached to the display surface P1 of the vehicle dashboard P to cover the display surface P1. The leather material E includes a foam layer 1 and a fabric layer 2. The foam layer 1 is attached to the display surface P1, and the foam layer 1 is foamed to provide a leather feel. The fabric layer 2 is disposed on a surface of the foam layer 1 away from the vehicle dashboard P, and the fabric layer 2 is color-matched and embossed to present a leather pattern 21.

Base materials of the foam layer 1 and the fabric layer 2 are both at least one material selected from the group consisting of polyvinyl chloride (PVC), polyurethane (PU), and polyolefin (PO), and the leather material in entirety has a visible light transmittance of between 40% and 70% and has a resistivity of not less than $10^{10}$ Ωcm.

When the display surface P1 of the vehicle dashboard P selectively displays the image, the image is visible to a user through the foam layer 1 and the fabric layer 2.

When the display surface P1 of the vehicle dashboard P does not display the image, the fabric layer 2 of the leather material E can shield the vehicle dashboard P, and the leather material E can present the leather pattern 22 through the fabric layer 2.

Beneficial Effects of the Embodiments

In conclusion, by virtue of "a leather material includes a foam layer and a fabric layer; the foam layer is foamed to provide a leather feel; the fabric layer is disposed on the foam layer, and the fabric layer is color-matched and embossed to present a leather pattern" and "base materials of the foam layer and the fabric layer are both at least one material selected from the group consisting of polyvinyl chloride (PVC), polyurethane (PU), and polyolefin (PO)" and "the leather material in entirety has a visible light transmittance of between 40% and 70% and has a resistivity of not less than $10^{10}$ Ωcm", the leather material of the present disclosure is suitable for being attached to a touch display panel such as a vehicle dashboard without affecting the image displaying effect and touch-control characteristics of the touch display panel.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A leather material, which is suitable for being attached to a touch display panel, the leather material comprising:
   a foam layer being foamed to provide a leather feel; and
   a fabric layer being disposed on the foam layer, and the fabric layer being color-matched and embossed to present a leather pattern;
   wherein base materials of the foam layer and the fabric layer are both at least one material selected from the group consisting of polyvinyl chloride (PVC), polyurethane (PU), and polyolefin (PO), and the leather material in entirety has a visible light transmittance of between 40% and 70% and has a resistivity of not less than $10^{10}$ Ωcm;
   wherein a thickness of the foam layer is greater than a thickness of the fabric layer, a hardness of the foam layer is less than a hardness of the fabric layer, and a visible light transmittance of the foam layer is greater than a visible light transmittance of the fabric layer.

2. The leather material according to claim 1, wherein, when the leather material is attached to the touch display panel, the foam layer is attached to a display surface of the touch display panel, and the leather pattern presented by the fabric layer faces an external environment.

3. The leather material according to claim 2, wherein the touch display panel is a vehicle dashboard with a touch display function; wherein, when the touch display panel selectively displays an image, the image is visible to a user through the foam layer and the fabric layer.

4. The leather material according to claim 3, wherein, when the touch display panel does not display the image, the fabric layer of the leather material is capable of shielding the touch display panel, and the leather pattern is capable of being shown through the fabric layer of the leather material.

5. The leather material according to claim 1, wherein the foam layer is a foamed material that is foamed by a foaming agent; wherein a ratio of a thickness of the foam layer after being foamed to a thickness of the foam layer before being foamed is defined as a foaming ratio, and the foaming ratio of the foam layer is between 105% and 130%; wherein the foam layer has the thickness of between 50 μm and 1,000 μm after being foamed.

6. The leather material according to claim 1, wherein the fabric layer has the thickness of between 2 micrometers and 200 micrometers, the fabric layer includes a color dye dispersed therein, and the color dye is dispersed in the fabric layer with a particle size of between 100 nanometers and 800 nanometers.

7. The leather material according to claim 6, wherein a content range of the color dye in the fabric layer is not greater than 40 wt %, and a side surface of the fabric layer away from the foam layer is embossed or engraved, so that the fabric layer is color-matched and embossed to present the leather pattern.

8. The leather material according to claim 1, wherein an overall thickness of the leather material is between 300 micrometers and 3,000 micrometers, and a ratio of the thickness of the foam layer to the thickness of the fabric layer is between 5 and 1,500.

9. The leather material according to claim 1, wherein the leather material has a plurality of visible light transmittances respectively at different regions thereof; wherein, in the plurality of visible light transmittances, a difference between a maximum visible light transmittance and a minimum visible light transmittance of the leather material is not greater than 1%.

10. A vehicle dashboard composite structure, comprising:
a vehicle dashboard having a display surface, and the display surface of the vehicle dashboard being configured to selectively display an image; and
a leather material being attached to the display surface of the vehicle dashboard to cover the display surface;
wherein the leather material includes:
a foam layer being attached to the display surface, and the foam layer being foamed to provide a leather feel; and
a fabric layer being disposed on the foam layer, and the fabric layer being color-matched and embossed to present a leather pattern;
wherein base materials of the foam layer and the fabric layer are both at least one material selected from the group consisting of polyvinyl chloride (PVC), polyurethane (PU), and polyolefin (PO), and the leather material in entirety has a visible light transmittance of between 40% and 70% and has a resistivity of not less than $10^{10}$ Ωcm;
wherein a thickness of the foam layer is greater than a thickness of the fabric layer, a hardness of the foam layer is less than a hardness of the fabric layer, and a visible light transmittance of the foam layer is greater than a visible light transmittance of the fabric layer.

11. The vehicle dashboard composite structure according to claim 10, wherein, when the vehicle dashboard selectively displays the image, the image is visible to a user through the foam layer and the fabric layer; wherein, when the vehicle dashboard does not display the image, the fabric layer of the leather material is capable of shielding the vehicle dashboard, and the leather pattern is capable of being shown through the fabric layer of the leather material.

* * * * *